United States Patent [19]

Fukuda et al.

[11] Patent Number: 4,939,232
[45] Date of Patent: Jul. 3, 1990

[54] SHRINKABLE POLYESTER FILM

[75] Inventors: Yujiro Fukuda; Shinobu Suzuki, both of Machida, Japan

[73] Assignee: Diafoil Company, Ltd., Tokyo, Japan

[21] Appl. No.: 373,586

[22] Filed: Jun. 30, 1989

[30] Foreign Application Priority Data

Jul. 5, 1988 [JP] Japan .............................. 63-167430

[51] Int. Cl.$^5$ ............................................. C08G 63/02
[52] U.S. Cl. ..................................... 528/272; 528/302;
528/304; 528/306; 528/308.2; 528/308.6;
528/502; 528/503; 525/437; 264/176.1;
264/177.19; 264/289.6; 264/290.2; 264/210.5;
264/210.7
[58] Field of Search ............... 528/272, 302, 304, 306,
528/308.2, 308.6, 502, 503; 525/437; 264/176.1,
177.19, 210.05, 210.07, 289.6, 290.2

[56] References Cited

U.S. PATENT DOCUMENTS

| 2,928,132 | 3/1960 | Richards | 264/235.8 |
| 4,020,141 | 4/1977 | Quinn et al. | 264/289 |
| 4,766,033 | 8/1988 | Yoshimura et al. | 428/332 |

FOREIGN PATENT DOCUMENTS 0694367   9/1964   Canada .

Primary Examiner—John Kight, III
Assistant Examiner—Sam A. Acquah
Attorney, Agent, or Firm—Oblon, Spivak, McClelland, Maier & Neustadt

[57] ABSTRACT

Disclosed in this invention is a shrinkable polyester film having a shrinkage of not less than 40% after 5-minute treatment in a 100° C. air oven in one of the machine and transverse directions, and a shrinkage of not more than 15% after 5-minute treatment in a 100° C. air oven and a maximum shrinkage stress of not more than 50 g/mm$^2$ at 40° to 100° C. in the other direction. The shrinkable film of this invention has the excellent shrink characteristics and are substantially free from wrinkling, curling at the end and non-uniformity of shrinkage when the film is shrunk, so that it is suited for use as a label film and has a high industrial value.

3 Claims, 1 Drawing Sheet

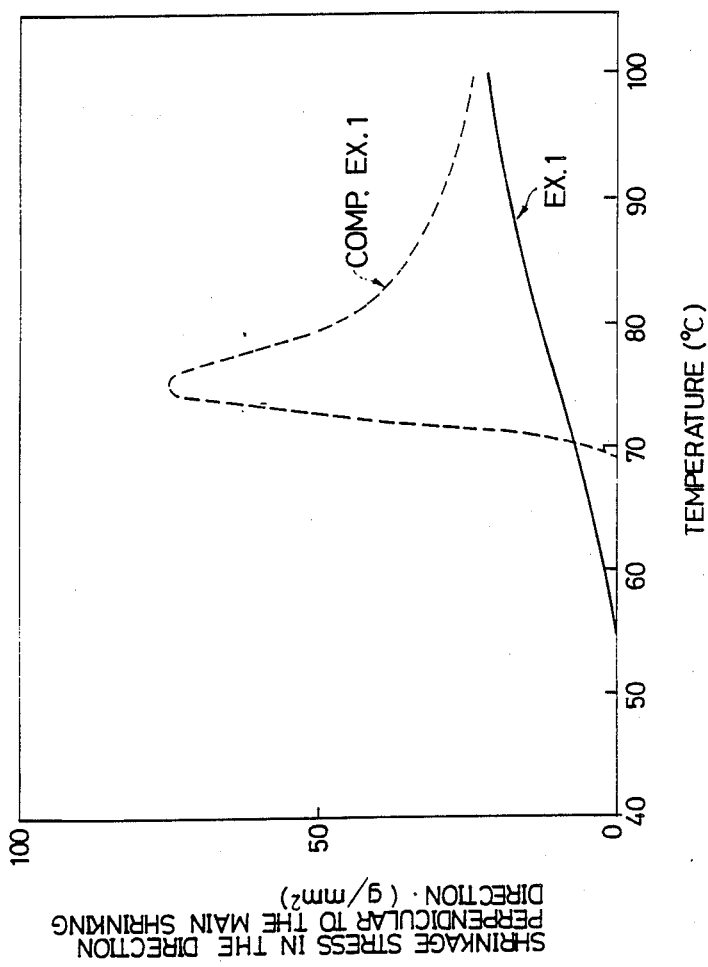

SHRINKABLE POLYESTER FILM

BACKGROUND OF THE INVENTION

The present invention relates to a shrinkable polyester film having excellent shrink characteristics. More particularly, relates to a shrinkable polyester film which is free from wrinkle of the film at the time of shrinkage, curling at the end of the film and non-uniform shrink.

Hitherto, shrinkable films made of polyvinyl chloride or polystyrene have been most popularly used in the field of shrinkable films for labels. These films, however, had the problems in combustion at the time of disposal of the films and recovery of the films from polyethylene terephthalate (PET) bottles. Recently, attention is focused on polyester shrinkable films for their potentialities in solving these problems.

These conventional polyester shrinkable films, however, were generally poor in shrink characteristics as they tended to be wrinkled or curled at the end thereof after shrinkage or would have non-uniformity in the degree of shrinkage. Therefore, the printed labels using such polyester shrinkable films involved problems such as non-uniformity in shade of prints after shrinkage and are not suitable for practical availability.

The present inventors had previously proposed a polyester shrinkable film improved in shrink characteristics in Japanese Patent Application Laid-Open (KOKAI) No. 110931 (1989).

The improvements proposed in the prior application, however, were not always satisfactory. For example, when this film was shrunk at a high temperature and in a short time as in case of labelling a heat-resistant PET bottle or glass bottle, there could occur wrinkle of the label, non uniform slide of prints, etc., making the film impractical for such use. Especially in labelling of heat-resistant PET bottles, it has been tried to reduce the time for shrinking work to meet a rapid increase of demand for PET bottle in recent years, but it was very difficult to use the conventional polyester shrinkable films under such conditions.

Thus, it has been an urgent request in the industry to develop a shrinkable polyester film which is free of the above problems in disposal and recovery and also greatly improved in shrink characteristics.

In view of the above, the present inventors have made further studies on the subject matter and found that a shrinkable polyester film having certain specific properties shows very excellent shrink characteristics in use as a shrink film for labels. The present invention was attained on the basis of such a finding.

SUMMARY OF THE INVENTION

In an aspect of the present invention, there is provided a shrinkable polyester film having a shrinkage of not less than 40% after 5-minute treatment in a 100° C. air oven in one of either the machine or transverse directions, and a shrinkage of not more than 15% after 5-minute treatment in a 100° C. air oven and a maximum shrinkage stress of not more than 50 g/mm$^2$ at 40° to 100° C. in the other direction.

BRIEF EXPLANATION OF THE DRAWING

FIG. 1 is a graph illustrating the shrink characteristics of the film of the present invention. In the graph, shrinkage stress (g/mm$^2$) in the direction orthogonal to the main shrinkage direction (direction in which the shrinkage is not less than 40%) is plotted as ordinate and measuring temperature (° C.) as abscissa. The solid line represents the results of measurement in Example 1 and the broken line the results of measurement in Comparative Example 1.

DETAILED DESCRIPTION OF THE INVENTION

The polyester used in the present invention may be a homopolyester or a copolyester which is obtained from the dicarboxylic acid component comprises one or more of the known dicarboxylic acids such as terephthalic acid, oxalic acid, malonic acid, succinic acid, adipic acid, suberic acid, azelaic acid, sebacic acid, phthalic acid, isophthalic acid, naphthalenedicarboxylic acid, diphenyl ether dicarboxylic acid and the like, and the diol component comprises one or more of the known diols such as ethylene glycol, neopentyl glycol, propylene glycol, trimethylene glycol, tetramethylene glycol, hexamethylene glycol, diethylene glycol, polyalkylene glycol, 1,4-cyclohexane dimethanol and the like. These polyesters may be used alone or as a mixture of two or more.

The copolyesters usable in this invention include those that can be obtained by using two or more of the above dicarboxylic acids and/or diols as the dicarboxylic acid component and/or diol component. It is also possible in this invention to use those copolyesters which can be obtained by using, in addition to the dicarboxylic acid(s) and diol(s), other component(s), for example, an oxycarboxylic acid such as p-oxybenzoic acid, p-oxyethoxybenzoic acid, etc., a monofunctional compound such as benzoic acid, benzoylbenzoic acid, methoxypolyalkylene glycol, etc., or a polyfunctional compound such as glycerin, pentaerythritol, trimethylol, trimethylenepropane, etc., in an amount within the range where the produced polyester becomes substantially a linear polymer.

In the present invention, it is preferred to employ a copolyester obtained by using terephthalic acid as the main dicarboxylic acid component and ethylene glycol as the main diol component, and further using, as copolymerization components, dicarboxylic acid such as isophthalic acid, phthalic acid, adipic acid, suberic acid, sebacic acid and 1,10-decanedicarboxylic acid and glycol such as neopentyl glycol, diethylene glycol, polyalkylene glycol and, if necessary, 1,4-cyclohexanedimethanol, because such copolyester is commercially available inexpensively and also can provide a film having excellent shrink characteristics.

A copolyester obtained by using the copolymerization components (dicarboxylic acids and diols other than terephthalic acid and ethylene glycol) is also preferred as it is capable of reducing shrinkage stress of the produced film as described later. It is especially preferred to employ a copolyester obtained by using an aliphatic dicarboxylic acid such as isophthalic acid, adipic acid, sebacic acid, 1,10-decanedicarboxylic acid, suberic acid and the like as the copolymerization component, because use of this copolyester enables lowering of the generation temperature of shrinkage stress of the film as further described later.

Preferred copolyester used in this invention is the one in which 70% by mole or more, more preferably 75% by mole or more of the dicarboxylic acid unit is constituted by terephthalic acid units and 70% by mole or more, more preferably 75% by mole or more of the diol unit is constituted by ethylene glycol units. When two or more kinds of polyester are used, 70% by mole or more, preferably 75% by mole or more of the total dicarboxylic acid unit in the polyester mixture is constituted by terephthalic acid unit, and 70% by mole, preferably 75% by mole or more of the total diol unit in the polyester mixture is constituted by ethylene glycol unit. When the terephthalic acid and/or ethylene glycol units in the copolyester are less than 70% by mole, the produced film proves to be poor in strength and solvent resistance.

More preferred polyester used in the present invention includes a polyester in which the dicarboxylic acid unit comprises 70 to 100 mol %, preferably 75 to 95 mol % of terephthalic acid unit and 0 to 30 mol %, preferably 5 to 25 mol % of at least one unit selected from the group consisting of isophthalic acid unit, adipic acid unit, suberic acid unit, sebacic acid unit and 1,10-decanedicarboxylic acid unit; and the diol unit comprises 70 to 100 mol %, preferably 75 to 95 mol % of ethylene glycol unit and 0 to 30 mol %, preferably 5 to 25 mol % of at least one unit selected from the group consisting of diethylene glycol unit and neopentyl glycol unit.

The glass transition temperature of the polyester used in the present invention is 35° to 70° C., preferably 40° to 65° C., more preferably 40° to 60° C.

In this invention, it is possible to add other polymer(s) than the polyesters provided that the amount of such polymer(s) is less than 30% by mole based on the polyester.

It is also preferred to add fine particles of an organic or inorganic lubricant for improving slipperiness of the film. In this invention, it is allowed to add various additives such as stabilizer, coloring matter, antioxidant, defoaming agent, antistatic agent, etc., as desired. The fine particles that can be used in this invention for providing desired slipperiness with the film include known inactive external particles of such materials as kaolin, clay, calcium carbonate, silicon oxide, calcium terephthalate, aluminum oxide, titanium oxide, calcium phosphate, lithium fluoride, carbon black, etc.; the particles of high-melting point organic compounds and crosslinked polymers which are infusible at the time of melt forming of polyester resin; and internal particles formed in the polymer in the course of formation of polyester by a metallic compound catalyst used in the synthesis of polyester, such as alkali metal compounds and alkali earth metal compounds. The content of the fine particles in the film is 0.005 to 0.9% by weight, and the average particle size (diameter) is 0.001 to 3.5 μm.

The heat of fusion of the film according to this invention is preferably in the range of 1 to 8 cal/g, more preferably 2 to 6 cal/g. When the heat of fusion of the film is less than 1 cal g, it is difficult to employ the drying method which is usually used in the production of polyethylene terephthalate film at the drying step before extrusion. Also, when the heat of fusion of the film exceeds 8 cal/g, such a film proves to be unsatisfactory in shrinkage.

The intrinsic viscosity of the film according to this invention is preferably 0.50 or above, more preferably 0.60 or above, most preferably 0.65 or above. When the intrinsic viscosity of the film is below 0.50, the film has too high crystallinity and is unsatisfactory in shrinkage.

In the film of this invention, it is essential that its shrinkage after 5-minute treatment in a 100° C. air oven is not less than 40%, preferably not less than 50%, in either machine or transverse direction. This direction of shrinkage is hereinafter called the main shrinkage direction of the film. In case the shrinkage in the main shrinkage direction of the film is less than 40%, the amount of shrinkage of the film is insufficient for using as a label so that the film may not adhere fast to the container or may be wrinkled.

In the film of the present invention, it is also essential that the shrinkage of the film in the direction orthogonal to the main shrinkage direction after 5-minute treatment in a 100° C. air oven is not greater than 15%, preferably not greater than 10%, more preferably not greater than 5%.

If the shrinkage in the direction orthogonal to the main shrinkage direction exceeds 15%, the film may be excessively shrunk along the lengthwise direction of the container, causing distortion, curling at the end and other adverse effects, when the film is shrunk as a label.

It is also necessary for the film of this invention that the maximum shrinkage stress in the direction orthogonal to the main shrinkage direction at 40° to 100° C. is 50 g/mm$^2$ or below, preferably 30 g/mm$^2$ or below.

In the case where the maximum shrinkage stress exceeds 50 g/mm$^2$, curling and/or wrinkling tends to occur especially at the area toward the upper end of the label when the film is shrunk as a label.

As means for improving shrinkage characteristics of shrinkable polyester films, it is suggested, for instance in Japanese Patent Application Laid Open (KODKAI) No. 91555/87, to reduce shrinkage stress in the main shrinkage direction or to reduce shrinkage of the film in the direction orthogonal to the main shrinkage direction.

The studies by the present inventors, however, have disclosed the fact that the shrinkage characteristics of shrink films, especially occurrence of curling and wrinkling at the upper and/or lower end of the film is largely dependent on the magnitude of the maximum shrinkage stress in the direction orthogonal to the main shrinkage direction at 40° to 100° C.

No definite elucidation of this fact is yet available, but the present inventors presume that the generation of a large shrinkage stress, such as exceeding 50 g/mm$^2$, in the direction orthogonal to the main shrinkage direction in the temperature region of 40° to 100° C. at which there can take place a sharp shrinkage of the film in the main shrinkage direction should cause excessive unstabilization of shrinking behavior of the film even when the shrinkage of the film in the direction orthogonal to the main shrinkage direction is small.

In the film according to this invention, the generation temperature of shrinkage stress in the main shrinkage direction is preferably 40° to 65° C., more preferably 45° to 65° C., even more preferably 45° to 60° C.

In the case where the generation temperature of shrinkage stress is below 40° C., when such a film is kept in storage for a long time, there may take place an excessive natural shrinkage before the shrinking work, making it impossible to attach the film closely to a bottle.

On the other hand, when the temperature is higher than 65° C., the shrinkage rate of the film in the shrink tunnel is lowered and it becomes difficult to effect uniform shrinkage, resulting in irregular shrinkage of the film and formation of many wrinkles.

The birefringence of the film of this invention is preferably in the range of 0.030 to 0.080, more preferably 0.040 to 0.080, most preferably 0.040 to 0.060.

The films with a birefringence less than 0.030 are poor in solvent resistance, uniformity of thickness, etc., and unsuited for use as a label, especially in terms of printability.

In the case of a film having a greater birefringence than 0.080, the generation temperature of shrinkage stress of such a film becomes undesirably high.

The degree of planar orientation of the film according to this invention is preferably in the range of 0.020 to 0.050, more preferably 0.020 to 0.040. When the degree of planar orientation is less than 0.020, the film is poor in solvent and hot water resistance. The films having a greater degree of planar orientation than 0.050 are increased in maximum shrinkage stress in the direction orthogonal to the main shrinkage direction.

Further, an expandable ink layer may be printed or a thermoplastic resin film or sheet having cells inside thereof may be laminated on one side or both sides of the film of this invention to provide the film with cushioning properties so as to improve the anti-break effect of the glass bottle after package. Any of the known thermoplastic resins such as polyvinyl chloride, polyethylene, polypropylene, polyacrylic resin, polystyrene, polyester, etc., is usable for this purpose.

The polyester shrinkable film of this invention having the above-described properties can be produced, for instance, in the following way.

A homopolyester or copolyester containing, as desired, proper amounts of additives such as inorganic particles serving as lubricant is dried by using an ordinary dryer such as hopper dryer, paddle dryer, vacuum dryer, etc., and then extruded at a temperature of 200° to 320° C. For extrusion, any of the known methods such as T-die extrusion method, tubular extrusion method, etc., can be used.

The extruded product is cooled rapidly to obtain an unstretched film. In case of using the T-die extrusion method, it is preferred to employ a so-called static charge adhesion method for rapid cooling as this enables obtainment of a film with a uniform thickness.

The obtained unstretched film is then monoaxially stretched, either in the machine direction or in the transverse direction, in one or more stages so that the finally obtained film would satisfy the property requirements specified in the present invention.

The one-stage monoaxial stretching is carried out by stretching the unstretched film 1.6 to 6.0 times, preferably 2.0 to 5.0 times the original length at a temperature of 50° to 150° C., preferably 60° to 120° C., either in the machine direction or in the transverse direction.

The multi-stage monoaxial stretching is carried out by stretching the unstretched film, in the first stage, 1.2 to 3.5 times, preferably 1.5 to 3.0 times the original length at a temperature of 90° to 150° C., preferably 90° to 130° C., either in the machine direction or in the transverse direction, and in the final stage, stretching the film 1.1 to 3.0 times, preferably 1.2 to 2.5 times at a temperature of 50° to 100° C., preferably 50° to 80° C. in the same direction as in the first stage stretching.

The above multi-stage stretching is preferable for reducing shrinkage stress in the direction orthogonal to the main shrinkage direction of the film. This is a preferred mode of stretching but is not the only way of stretching envisaged in the present invention. For effecting this monoaxial stretching, there can be employed, for instance, a method in which the film is stretched in the machine direction with rolls or a method in which the film is stretched in the transverse direction by a tenter.

For obtaining a film having the specified properties of the present invention, it is also possible to employ a biaxial stretching method in which the film is strongly stretched in one direction of the machine direction and the transverse direction, and stretched to the smallest possible degree in the other direction.

For obtaining a biaxially stretched film which has been strongly stretched in one of either the transverse direction or the machine direction, the unstretched film is stretched 1.6 to 6.0 times, preferably 2.0 to 5.0 times the original length in one of either the transverse direction or the machine direction at a temperature of 50° to 150° C., preferably 60° to 130° C., and stretched 1.01 to 2.0 times, preferably 1.01 to 1.6 times in the other direction at a temperature of 50° to 150° C., preferably 60 to 130° C. Biaxial stretching, i.e. stretching in the machine direction and stretching in the transverse direction, may be effected either successively or simultaneously. If necessary, the biaxially stretched film may be re-stretched 1.01 to 3.0 times, preferably 1.01 to 2.0 times in the direction in which the film is stretched strongly at a temperature of 50° to 150° C., preferably 60° to 130° C.

It is a preferred means for effectuating uniform shrinkage of the film to subject the stretched film to a heat treatment at a temperature of 60° to 100° C. for a period of 0.01 to 60 seconds, preferably 0.01 to 30 seconds. This heat treatment is usually carried out under fixation with stress, but it may be carried out under a relaxation or tentering of 20% or less. For such heat treatment, there can be used the known methods such as a method in which the film is contacted with a heated roll and a method in which the film is heated by holding it with clips in a tenter. Also, the film may be re-stretched after the heat treatment.

A corona discharge treatment may be applied to one side or both sides of the film in the course of, before or after the stretching step to improve adhesiveness of the film to a printed layer, etc.

Also, coating may be made on one side or both sides of the film in the course of, before or after stretching to improve adhesiveness, antistatic properties, slipperiness, shielding effect, etc, of the film.

The thus obtained film is wound up and offered as a product.

The thickness of the film obtained in the manner described above is not specified, but the preferred thickness of the film when used as a shrinkable film for labelling is 10 to 300 μm, more preferably 15 to 200 μm.

As described above, by fulfilling the specified requirements of the present invention, it is possible to obtain a shrinkable polyester film having excellent shrink characteristics and substantially free from distortion, wrinkling and non-uniform shrinkage of the film when shrunk.

The present invention will hereinafter be described more particularly with reference to the following non-limitative examples.

The film evaluation methods used in the present invention are as follows.

(1) Intrinsic viscosity [η] of film 200 mg of specimen was added to 20 ml of a 50/50 mixed solvent of phenol and tetrachloroethane, and after heating the mixture at about 110° C. for one hour, measurement was made at 30° C.

(2) Glass transition temperature (Tg) of polyester

This was measured by DSC-1B of The Perking-Elmer Corp., by heating the specimen at a rate of 4° C./min.

(3) Heat of fusion of the film (cal/g)

The area under the temperature-time curve obtained by the fusion of the film under the conditions of sensitivity of 4, temperature increasing speed of 16° C./min and chart speed of 40 mm/min using DSC-1B produced by Perkin Elmer Corp. was calculated and the heat of fusion of the film was calculated according to the following formula:

$$\text{Heat of fusion} = A \cdot S \cdot \frac{1}{m}$$

wherein A is the heat of fusion of indium per unit area (cal/cm$^2$) on the chart under the same conditions as above; S is the total area under the fusion curve of the film and m is the weight (g) of the film.

(4) Shrinkage

The test film was cut into a 1 cm×10 cm piece, and after it has been heat shrunk in an air oven of 100±2° C. under a non-loaded state for 5 minutes, the shrinkage was determined for both machine direction and transverse direction of the film according to the following formula. The direction in which the determined shrinkage was greater was designated the main shrinkage direction.

$$\text{Shrinkage} = \frac{L0 - L}{L0} \times 100 \, (\%)$$

Lo: original length (10 cm)
L: length after shrinkage (5) Maximum shrinkage stress and generation temperature of shrinkage stress These were measured by using INTESCO 2001 of Intesco Co., Ltd., using a sample piece cut out from the test film so that the sample piece would have a width of 1 cm and a chuck interval of 10 cm, by heating the sample piece at a rate of 10° C./min.

Regarding the maximum shrinkage stress, there was determined the greatest shrinkage stress at 40° to 100° C. in the direction orthogonal to the main shrinkage direction. As for the generation temperature of shrinkage stress, the temperature at which shrinkage stress became 5 g/mm$^2$ or greater in the main shrinkage direction was referred to as the generation temperature of shrinkage stress.

(6) Birefringence Δn

Retardation was measured by a polarization microscope made by Karl Zeiss Inc., and the Birefringence (Δn) was determined from the following formula.

$$\Delta n = R/d$$

R: retardation
d: film thickness (7) Degree of planar orientation ΔP

The refractive index of the film was measured by an Abbe's refractometer mfd. by Atago Co., Ltd., using a sodium lamp as light source.

The maximum refractive index nα in the film plane, the refractive index nβ in the direction orthogonal thereto, and the refractive index nγ in the thickness direction were measured, and the degree of planar orientation ΔP was determined from the following formula.

$$\Delta P = \tfrac{1}{2}(n_\alpha + n\beta) - n\gamma$$

(8) Shrink characteristics of film

The test film was printed as a shrink label and made into a cylindrical form. This cylindrical film (label) was attached to a heat resistant PET bottle and shrunk in a 160° C. oven for 15 seconds, after which the finish of shrinkage of the film was visually evaluated in terms of the following three points: wrinkling, curling at the end, and non uniformity in shade of printed image, and graded by the marks of O, Δ and x regarding each of the three points. O indicates that the film was substantially free of defect, Δ indicates that the film had a slight defect but was capable of practical use, and x indicates that the film had so much of defect that it was incapable of practical use. Also, a total evaluation was made of shrink characteristics by considering the evaluations on the three points and expressed by the marks of O (satisfactory) and x (unsatisfactory).

EXAMPLE 1

There was prepared a copolyester in which the dicarboxylic acid unit consisted of 85% by mole of terephthalic acid units and 15% by mole of sebacic acid units and the diol unit consisted of 97% by mole of ethylene glycol units and 3% by mole of diethylene glycol units, and which contained 300 ppm of amorphous silica with an average particle diameter of 1.2 μm and had an intrinsic viscosity [η] of 0.66 and a glass transition temperature (Tg) of 51° C. This copolyester was dried by a conventional method, extruded at 280° C. from an extruder and rapidly cooled and solidified to obtain an unstretched film.

This unstretched film was directly led into a tenter by which the film was first stretched 2.0 times the original length in the transverse direction at 120° C. and then further stretched 1.8 times at 65° C. The stretched film was subjected to a heat treatment under stress at 78° C. for 5 seconds, then cooled and wound up to obtain a film having an average thickness of 45 μm.

EXAMPLE 2

A copolyester comprising, as dicarboxylic acid unit, 90% by mole of terephthalic acid units and 10% by mole of 1,10-decanedicarboxylic acid units and, as diol unit, 90% by mole of ethylene glycol units and 10% by mole of neopentyl glycol units, containing 500 ppm of fine particles of calcium carbonate with an average particle diameter of 1.0 μm, and having an intrinsic viscosity [η] of 0.71 and Tg of 57° C., was dried by a conventional method after preliminary crystallization, then extruded at 290° C. from an extruder, and rapidly cooled and solidified to obtain an unstretched film.

This unstretched film was stretched 1.05 times in the machine direction at 110° C. and then led into a tenter by which the film was stretched 2.5 times in the transverse direction at 110° C. and then further stretched 1.6 times transversely at 70° C. The thus stretched film was subjected to a heat treatment under stress at 80° C. for 3 seconds, then cooled and would up to obtain a film having an average thickness of 40 μm.

EXAMPLE 3

A copolyester comprising, as dicarboxylic acid unit, 80% by mole of terephthalic acid units and 20% by mole of isophthalic acid units and, as diol unit, 98% by mole of ethylene glycol units and 2% by mole of diethylene glycol units, containing 500 ppm of spherical silica with an average particle diameter of 0.8 μm, and having an intrinsic viscosity [η] of 0.70 and Tg of 66° C., was dried by a conventional method, then extruded at 260° C. from an extruder, and cooled and solidified to obtain an unstretched film.

This unstretched film was directly led into a tenter and thereby stretched 3.0 times the original length in the transverse direction at 130° C. and further stretched 1.5 times in the same direction at 70° C. The stretched film was subjected to a heat treatment under stress at 75° C. for 10 seconds, then cooled and wounds up to obtain a film with an average thickness of 40 μm.

COMPARATIVE EXAMPLE 1

By using a copolyester with [η] of 0.67 and Tg of 75° C., in which the dicarboxylic acid unit was constituted by terephthalic acid and the diol unit consisted of 87% by mole of ethylene glycol units and 13% by mole of neopentyl glycol units, and which contained 300 ppm of amorphous silica having an average particle diameter of 1.2 μm, the same film forming process as Example 2 was carried out to obtain a film having an average thickness of 60 μm.

The results of evaluations of the films obtained in the above Examples and Comparative Examples are shown collectively in Table 1.

TABLE 1

| | Shrinkage (%) | | Maximum shrinkage stress (g/mm$^2$) | Generation temperature of shrinkage stress (°C.) | Double refractive index | Degree of flavor orientation | Shrink characteristics | | | |
|---|---|---|---|---|---|---|---|---|---|---|
| | In the machine direction | In the transverse direction | | | | | Wrinkling | Curling at the end | Shade of of prints | Total evaluation |
| Example 1 | 3 | 52 | 21 | 54 | 0.045 | 0.031 | O | O | O | O |
| Example 2 | 1 | 56 | 28 | 57 | 0.055 | 0.037 | O | O | O | O |
| Example 3 | −2 | 60 | 12 | 60 | 0.052 | 0.029 | O | O | O | O |
| Example 4 | 54 | 0 | 26 | 57 | 0.055 | 0.038 | O | O | O | O |
| Comp. Example 1 | 4 | 58 | 115 | 62 | 0.085 | 0.064 | Δ | x | O~Δ | x |

EXAMPLE 4

A copolyester comprising, as dicarboxylic acid unit, 60% by mole of terephthalic acid units, 20% by mole of isophthalic acid units and 20% by mole of adipic acid units, with the diol unit constituted by ethylene glycol, was blended with polyethylene terephthalate containing fine particles in a ratio by weight of 50 to 50, and the blend was dried in vacuo, extruded at 280° C., and rapidly cooled and solidified to obtain an unstretched film. Intrinsic viscosity [η] of this film was 0.68, and its glass transition temperature (Tg) was 61° C.

This unstretched film was stretched 2.0 times in the machine direction by the heated rolls of 110° C. and then further stretched 1.6 times in the same direction by the heated rolls of 75° C. The stretched film was subjected to a heat treatment by contacting it with each of three heated rolls of 83° C. for a period of 0.15 second, and then would up to obtain a film having an average thickness of 30 μm.

What is claimed is:

1. A shrinkable polyester film having a shrinkage of not less than 40% after 5.minute treatment in a 100° C. air oven in one of either the machine direction or the transverse direction, and a shrinkage of not more than 15% after 5-minute treatment in a 100° C. air oven and a maximum shrinkage stress of not more than 50 g/mm$^2$ at 40° to 100° C. in the other direction.

2. The shrinkable polyester film according to claim 1, wherein the dicarboxylic acid unit of the polyester comprises 70 mol % or more of terephthalic acid unit and the diol unit of the polyester comprises 70 mol % or more of ethylene glycol unit.

3. The shrinkable polyester film according to claim 2, wherein the dicarboxylic acid unit of the polyester comprises 70 to 100 mol % of terephthalic acid unit and 0 to 30 mol % of at least one unit selected from the group consisting of isophthalic acid unit, adipic acid unit, suberic acid unit, sebacic acid unit and 1,10-decanedicarboxylic acid unit, and the diol unit of the polyester comprises 70 to 100 mol % of ethylene glycol unit and 0 to 30 mol % of at least one unit selected from the group consisting of diethylene glycol unit and neopentyl glycol unit.

* * * * *